United States Patent
Otte et al.

(10) Patent No.: US 9,914,347 B2
(45) Date of Patent: Mar. 13, 2018

(54) TORQUE ROLL AXIS MOUNTING SYSTEM FOR SERIAL RANGE EXTENDERS WITHOUT A THROUGH-DRIVE

(71) Applicant: Bayerische Motoren Werke Aktiengesellschaft, Munich (DE)

(72) Inventors: Alexander-Wilhelm Otte, Egenhofen (DE); Sebastian Pflaum, Maisach (DE); Andreas Raith, Ottobrunn (DE); Arthur Huelsmann, Munich (DE); Tomasz Jedraszek, Groebenzell (DE); Thomas Muschler, Ingolstadt (DE); Bernhard Hoess, Munich (DE); Richard Eiletz, Deisenhofen (DE); Udo Ochner, Haimhausen (DE); Christian Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/147,996

(22) Filed: May 6, 2016

(65) Prior Publication Data
US 2016/0243925 A1   Aug. 25, 2016

Related U.S. Application Data

(63) Continuation of application No. PCT/EP2014/071359, filed on Oct. 6, 2014.

(30) Foreign Application Priority Data

Nov. 8, 2013 (DE) .................. 10 2013 222 778

(51) Int. Cl.
*B60K 5/12* (2006.01)
*B60L 11/02* (2006.01)
*B60L 11/18* (2006.01)

(52) U.S. Cl.
CPC .......... *B60K 5/1266* (2013.01); *B60K 5/1216* (2013.01); *B60L 11/02* (2013.01);
(Continued)

(58) Field of Classification Search
CPC ..... B60K 5/1266; B60K 5/1216; B60L 11/02; B60L 11/1809; B60L 11/123; B60Y 2400/204; B60Y 2200/90; B60Y 2200/92
(Continued)

(56) References Cited

U.S. PATENT DOCUMENTS 1,996,166 A * 4/1935 Meyer .................. B60K 5/1216
                                                         248/559
2,076,046 A * 4/1937 Schjolin
(Continued)

FOREIGN PATENT DOCUMENTS

DE    24 34 633 A1    2/1975
DE    40 09 995 A1    9/1991
(Continued)

OTHER PUBLICATIONS

JP2000296719 Machine Translation, Hokari, Tsukasa, Filing date: Apr. 14, 1990.*
(Continued)

*Primary Examiner* — Muhammad Ijaz
(74) *Attorney, Agent, or Firm* — Crowell & Moring LLP

(57) ABSTRACT

A mounting device is provided for oscillatingly mounting a range extender, which consists of an internal combustion engine and a generator, on a body and/or a chassis of a motor vehicle by way of vibration-damping elements. At least two of the vibration-damping elements are integrated in load-carrying bearings and one additional one is integrated in a supporting bearing for supporting moments. The mounting device is characterized in that the vibration-damping elements of the mounting device at least for the load-carrying
(Continued)

bearings are secured to the range extender, i.e. a first vibration-damping element is secured to the internal combustion engine and a second vibration-damping element is secured to the generator.

9 Claims, 2 Drawing Sheets

(52) U.S. Cl.
CPC ....... *B60L 11/1809* (2013.01); *B60Y 2200/90* (2013.01); *B60Y 2200/92* (2013.01); *B60Y 2400/204* (2013.01)

(58) Field of Classification Search
USPC ..... 248/605, 607, 638, 639; 180/92, 97, 300
See application file for complete search history.

(56) References Cited

U.S. PATENT DOCUMENTS

| | | | | |
|---|---|---|---|---|
| 2,078,046 | A | | 4/1937 | Schjolln |
| 2,138,656 | A | * | 11/1938 | Gouldthorpe ............ H02K 5/24 248/605 |
| 3,825,090 | A | | 7/1974 | Runkle et al. |
| 4,564,082 | A | * | 1/1986 | Takehara ................. B60K 5/04 180/291 |
| 7,185,723 | B2 | * | 3/2007 | Aoyama .............. B60K 5/1208 180/300 |
| 2005/0223786 | A1 | * | 10/2005 | Akkerman ........... B60K 5/1216 73/117.01 |
| 2012/0312622 | A1 | | 12/2012 | Hoermandinger et al. |
| 2013/0161111 | A1 | | 6/2013 | Kim et al. |
| 2013/0227834 | A1 | * | 9/2013 | Nordstrom .............. F16F 15/06 29/592.1 |
| 2015/0144763 | A1 | * | 5/2015 | Aeffner .................... F16M 5/00 248/562 |

FOREIGN PATENT DOCUMENTS

| | | |
|---|---|---|
| DE | 199 39 304 B4 | 5/2004 |
| DE | 10 2009 015 414 A1 | 9/2010 |
| DE | 10 2011 102 774 A1 | 11/2012 |
| DE | 10 2011 050 986 A1 | 12/2012 |
| DE | 10 2012 112 933 A1 | 6/2013 |
| JP | 55-25676 A | 2/1980 |
| JP | 4-191126 A | 7/1992 |
| JP | 2000-296719 A | 10/2000 |
| JP | 2000296719 * | 10/2000 |
| JP | 2013-154789 A | 8/2013 |

OTHER PUBLICATIONS

International Search Report (PCT/ISA/210) issued in PCT Application No. PCT/EP2014/071359 dated Jan. 27, 2015 with English translation (seven pages).
German-language Office Action issued in counterpart European Application No. 14 780 885.1 dated Oct. 11, 2017 (seven (7) pages).

\* cited by examiner

TORQUE ROLL AXIS MOUNTING SYSTEM FOR SERIAL RANGE EXTENDERS WITHOUT A THROUGH-DRIVE

CROSS REFERENCE TO RELATED APPLICATIONS

This application is a continuation of PCT International Application No. PCT/EP2014/071359, filed Oct. 6, 2014, which claims priority under 35 U.S.C. § 119 from German Patent Application No. 10 2013 222 778.7, filed Nov. 8, 2013, the entire disclosures of which are herein expressly incorporated by reference.

BACKGROUND AND SUMMARY OF THE INVENTION

The present invention relates to a subassembly mounting device for oscillatingly mounting a range extender on a body and/or a chassis of a motor vehicle.

Additional assemblies in an electric vehicle, which increase the range of the vehicle, are known as so-called range extenders. The most frequently used range extenders are internal combustion engines, which drive a generator. The generator, in turn, supplies current to the battery and the electric motor. Because of the limited battery capacity and the limited charging rate, today electric vehicles normally have shorter ranges than vehicles with an internal combustion engine. An additional aggravating factor with an electric vehicle is that the vehicle is ready for use again only after an ex ended charging time of approximately 1-2 hours, contrary to the very fast refueling process with conventional vehicles. The range extenders are therefore used to extend the time during which the vehicle can be used continuously, that is the time between charging cycles, and therefore the operating range. The electric vehicle can be operated without range extenders during daily commuter traffic.

Highly varied mounting embodiments for the engine and/or the transmission of motor vehicles are known. These mounts can permit vibrations or relative movements between the drive unit and the vehicle body; however, these relative movements must not only be dampened but must also be limited in terms of the distance or deflection to prevent that parts of the drive unit strike against the vehicle body in an undesirable manner. Mounts for a motor vehicle drive unit, which includes a torque roll axis, are also known from DE 40 09 995 A1. Here, the drive unit has two mounts which lie on the torque roll axis, and a further mount which is disposed spaced apart from the torque roll axis. For this purpose, one of the mounts on the torque roll axis serves as a load-carrying bearing to support the weight of the drive unit. The torque roll axis is the axis about which a floating unit exercises a rolling oscillation from the gas forces of the combustion due to the periodic rolling moment excitation. The further mount spaced apart from the torque roll axis causes an additional stabilization via a torque damper.

The object of the present invention is to provide a mounting device for oscillatingly mounting a range extender, which consists of an internal combustion engine and a generator, on a body and a chassis of a motor vehicle by means of vibration-damping elements, which reduces the overall loading of the chassis by eliminating the introduced forces and vibrations via an optimized vibration isolation between the range extender and the vehicle body, while at the same time improving comfort regarding noise and solidity.

This and other objects are achieved according to the invention by a mounting device for oscillatingly mounting a range extender, which consists of an internal combustion engine and a generator, on a body and/or a chassis of a motor vehicle by way of vibration-damping elements, at least two of which are integrated in load-carrying bearings and one additional one is integrated in a supporting bearing for supporting moments. The mounting device is characterized in that the vibration-damping elements of the mounting device at least for the load-carrying bearings are secured to the range extender, i.e. a first vibration-damping element is secured to the internal combustion engine and a second is secured to the generator.

This has the advantage of improving the comfort regarding noise and solidity. In particular with range extenders, which are frequently operated independently of the driving task, it is very important that the acoustics and vibrations of the range extender are designed to make the driving experience for passengers in the vehicle as pleasant as possible.

Advantageous embodiments of the invention provide that the vibration-damping element for the supporting bearing is secured to the range extender. If both load-carrying bearings of the range extender are then still disposed on its torque roll axis, this has the advantage that the mounting optimally isolates the range extender with respect to the acoustics and vibrations, because no constrained motion/vibration is imposed on the unit. The unit oscillates freely about its roll axis, and the load-carrying bearings and the pendulum support transmit significant static forces from accelerations such as gravitational acceleration, transverse acceleration during cornering and/or longitudinal acceleration. If both load-carrying bearings and the supporting bearing of the range extender have a progressive stiffness practically without drag torque in the range from zero to three millimeters on the supporting bearing for damping of torsional vibrations of the range extender about the torque roll axis and both load carrying bearings exert the same restoring moment on the range extender, the invention therefore achieves optimal acoustic and vibrational decoupling. For this purpose, advantageously instead of four unit bearings, according to the prior art for longitudinal support, merely two engine mounts and one pendulum support are required, by which the supporting bearing is connected with the body with the aid of a pivot. This keeps costs low and increases service life, since wear is minimized because only minimal travel is caused in the engine mounts due to the engine rolling oscillation, which contributes to conserving the mounts.

A preferred embodiment of the invention is characterized in that at east one of the two load-carrying bearings is connected with the body via at least one frame. It is therefore easily possible to ensure maximum rigidity of the suspension of the range extender in its longitudinal direction, which is consistent with a lightweight design, while the mounts gently support twisting of the range extender about the torque roll axis in the transverse direction. With such optimal design, the range extender can be operated in a manner such that the passengers in the motor vehicle are unaware of it, which permits pleasant driving conditions and freedom in selecting an efficient operational strategy.

Other objects, advantages and novel features of the present invention will become apparent from the following detailed description of one or more preferred embodiments when considered in conjunction with the accompanying drawings.

BRIEF DESCRIPTION OF THE DRAWINGS

In all figures, identical technical components are designated with identical reference symbols and all features more closely described can be essential for the invention.

DETAILED DESCRIPTION OF THE DRAWINGS

Figure 1:
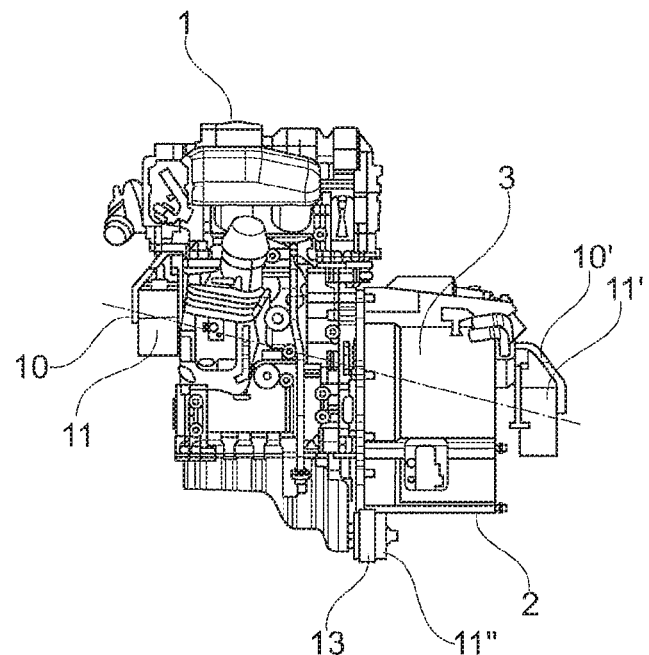
FIG. 1 is a schematic diagram of an exemplary embodiment of a mounting device for a range extender in a first view.
Figure 2:
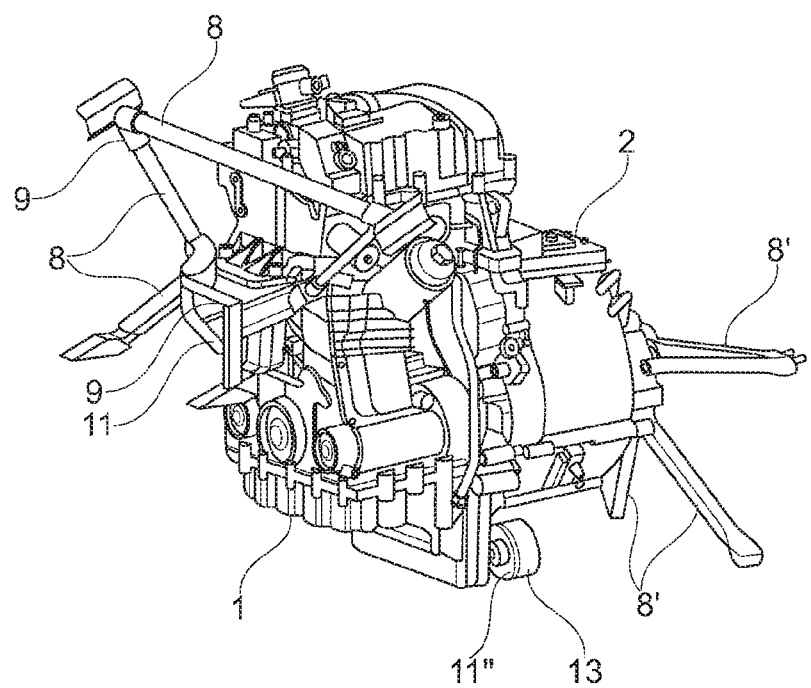
FIG. 2 is a schematic diagram of an exemplary embodiment of a mounting device for a range extender in a second view.
Figure 3:
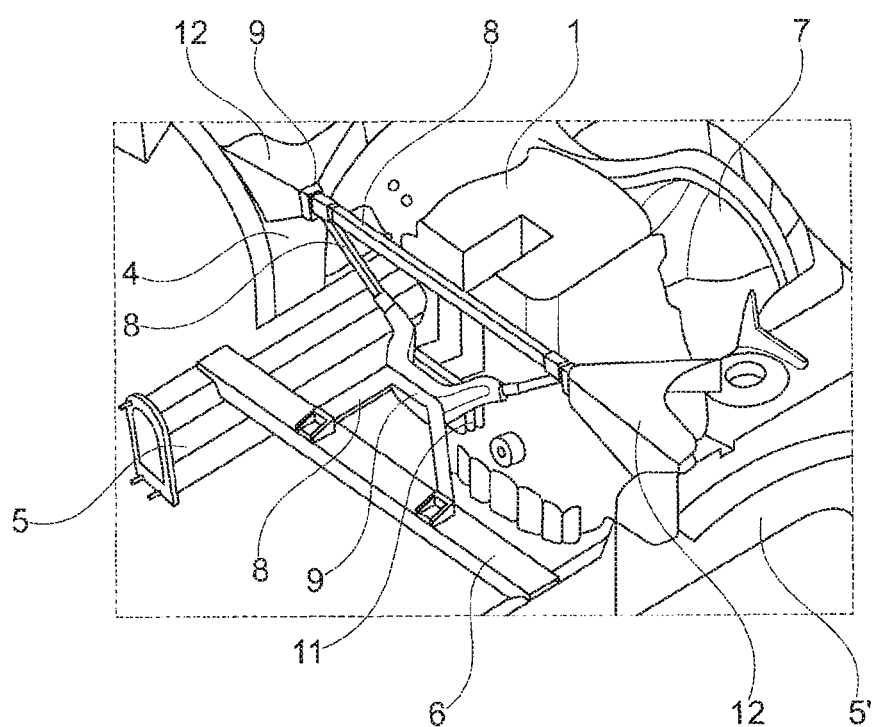
FIG. 3 is a schematic diagram illustrating the mounting device on a motor vehicle body.

FIGS. 1 to 3 illustrate a mounting device for a range extender for oscillatingly mounting a unit consisting of an internal 1 combustion engine 1 and a generator 2 driven by it on a motor vehicle body 4 (see FIG. 3). The internal combustion engine 1 is a parallel-twin engine, the forces of which are fully compensated by balancer shafts in the vertical axis direction. The tilting moments or also rolling moments about the longitudinal axis can be transferred by the described invention in the form of free rolling oscillation, which the range extender executes about its torque roll axis 3.

Aside from run-up, no housing moment, also known as output torque, is to be supported during operation of the range extender affixed below the front hood (not shown) on the body 4 of the vehicle.

The vehicle body 4 is connected in the customary manner with two vehicle frame side members 5, 5' by means of a connection (not illustrated in detail), which frame side members in turn are connected by a cross member 6. A first bearing device of the mounting device for the range extender is supported on the cross member 6, that is a frame made up of rods 8 and joints 9 on the side of the body or the Chassis, onto which the range extender is secured, by interposing a vibration-damping element 11, via a second bearing device as a seat 10 on the side of the unit, which is connected directly with the internal combustion engine 1. The seat 10 on the side of the unit and the vibration-damping element 11, together form a first load-carrying bearing (10, 11) for the range extender.

The generator 2 is directly flange-mounted on the internal combustion engine 1. A support of the generator 2 (not shown in FIG. 3) on one side of the unit extending to the interior of the motor vehicle, in the proximity of a bulkhead (not show of the body 4 and a body tunnel 7 (FIG. 3), occurs via further rods 8', as further first bearing device on the side of the body or chassis of the mounting device for the range extender, by interposing a further vibration-damping element 11' via a further second bearing device as further seat 10' on the side of the unit, directly on the generator 2. The further seat 10' on the side of the unit and the further vibration-damping element 11' together form a second load-carrying bearing (10', 11') for the range extender. The two rods 8' pointing downward are connected on the side of the vehicle with the underbody (not shown); the rod 8' facing rearward is connected on the side of the vehicle with the body tunnel 7.

The seat 10 on one side of the unit or the further seat 10' on another side of the unit can alternatively also be designed like a rubber/metal mount in one piece with the vibration-damping element 11 or with the further vibration-damping element 11', in each case as first and second load-carrying bearings. The rods 8, 8' may be formed of fiber reinforced plastic and the joints 9 of light metal. To secure the rods 8, 8' of the first bearing device on the side of the body, seating fixtures 12 are provided on the side of the body for seating the rods 8, 8'. The structure of the first bearing device for seating the front engine mount is also linked to the frame side rails 5, 5' and is designed as a light, rigid framework in CFC-aluminum composite construction. The rigidities of the link in the longitudinal direction will still be increased by supporting members from the engine mount seating on the cross member 6.

A hinged support bearing 13 for a hinged support (not shown) for a soft, movable support for the range extender, transversely on the body 4 or on one of the frame side members 5, 5', is secured to the bottom of the internal combustion engine 1 in the flange-mounting area of the generator 2. In this way, the range extender is pivoted about its torque roll axis 3 with two seats 10, 10' on the side of the unit and the soft hinged support bearing 13. Reactive forces are prevented because the range extender can pivot freely about its torque roll axis 3. The inertia sensor of the range extender and the axis direction of the installed crankshaft are decisive for the direction of the torque roll axis 3, which always runs through the center of gravity of the unit consisting of the internal combustion engine 1 and the generator 2. The bearing devices form respective linking structures for the two seats 10, 10' on the side of the unit with the vibration-damping elements 11, 11' as first and second load-carrying bearings on the body of the vehicle and together with the hinged support bearing 13 and the hinged support form the mounting device for the range extender.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A mounting device arrangement for oscillatingly mounting a range extender on a vehicle body and/or a chassis, the mounting device arrangement comprising:
   an internal combustion engine and a generator of the range extender;
   only two load-carrying bearings in each of which a respective vibration-damping element is integrated;
   only one supporting bearing located away from an axis extending between the two load-carrying bearings, the supporting bearing being arranged to resist moments generated by the range extender around the axis between the two load-carrying bearings and having a supporting bearing vibration-damping element integrated in the supporting bearing,
   wherein
   the vibration-damping elements of the two load-carrying bearings of the mounting device are secured to the range extender, in that
      a first vibration-damping element of the respective vibration-damping elements of the two load-carrying bearings is secured to the internal combustion engine to resist rotation about the axis between the two load-carrying bearings, and
      a second vibration-damping element of the respective vibration-damping elements of the two load-carrying bearings is secured to the generator to resist rotation about the axis between the two load-carrying bearings.

2. The mounting device arrangement according to claim 1, wherein the supporting bearing vibration-damping element integrated in the supporting bearing is secured to the range extender.

3. The mounting device arrangement according to claim 2, wherein the axis extending between the two load-carrying bearings of the range extender is a torque roll axis of the range extender.

4. The mounting device arrangement according to claim 1, wherein the axis extending between the two load-carrying bearings of the range extender is a torque roll axis of the range extender.

5. The mounting device arrangement according to claim 4, wherein
the two load-carrying bearings and the supporting bearing have a rigidity which increases with increasing displacement from respective unloaded positions in a range of displacement corresponding to a lateral displacement of the supporting bearing from 0 to 3 mm during damping of torsional vibrations of the range extender about the torque roll axis.

6. The mounting device arrangement according to claim 5, wherein when the two load-carrying bearings are displaced about the torque roll axis in response to the torsional vibrations of the range extender, the two load-carrying bearings exert a same restoring moment counter to the torsional vibrations on the range extender.

7. The mounting device arrangement according to claim 1, wherein the supporting bearing is configured to be connected with the vehicle body via a pivot.

8. The mounting device arrangement according to claim 7, further comprising:
a frame configured to connect the one of the two load-carrying bearings having the first vibration-damping element to the vehicle body.

9. The mounting device arrangement according to claim 1, further comprising:
a frame configured to connect the one of the two load-carrying bearings having the first vibration-damping element to the vehicle body.

* * * * *